UNITED STATES PATENT OFFICE 2,168,228

SUSPENSION OF MAGNESIUM HYDROXIDE AND MATERIALS AND PROCESS FOR MAKING SAME

Roger A MacArthur, Wyoming, Ohio, assignor to The Philip Carey Manufacturing Company, a corporation of Ohio No Drawing. Application December 28, 1936,
Serial No. 117,889

28 Claims. (Cl. 167—72)

This invention relates to the suspension of magnesium hydroxide in water and to suspensions or "milks" thereof, and is a continuation in part of my application Serial No. 646,299, filed Dec. 8, 1932, for Suspensions of magnesium hydroxide and materials and process for making same. This invention relates particularly to improving the consistency and suspension (non-settling) properties of milks of magnesia, to improving the rate of solution of milks of magnesia in dilute acid, to improving the uniformity of structure and particle size of the magnesium hydroxide particles in milks of magnesia, and to improving upon the process of manufacturing milks of magnesia.

Suspensions of magnesium hydroxide in water will be referred to herein as milks of magnesia. Milk of magnesia containing about 8% of $Mg(OH)_2$ by weight is a widely sold and popular pharmaceutical preparation. It is prescribed under the name "Magma Magnesia" by the U. S. Pharmacopoeia X, which states that the solid content shall not be less than 7% by weight. It is generally used as an antacid and mild laxative for internal human consumption. In order that the magnesium hydroxide in milk of magnesia made for pharmaceutical purposes be as chemically active as possible, it is desirable that the magnesium hydroxide be dispersed in water as completely as possible and in as finely divided a state as possible. This invention improves upon milks of magnesia, including the pharmaceutical preparations above described, and the manufacturing process thereof.

Milk of magnesia has heretofore been manufactured commercially for the most part according to either of two methods. According to one method, milk of magnesia is made by treating a magnesium salt, such as magnesium sulphate, chloride, or basic carbonate, with an alkali. The reaction is believed to be as follows, using $MgSO_4$ and NaOH by way of illustration:

$$MgSO_4 + 2NaOH = Mg(OH)_2 + Na_2SO_4$$

When milk of magnesia is manufactured according to the above metathesis of a soluble magnesium salt and an alkali, the magnesium sulphate, for example, is made up into a solution 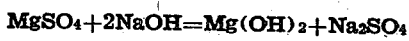 which is heated, and sodium hydroxide, for example, is added to the hot solution, forming a gelatinous precipitate of magnesium hydroxide. The gelatinous precipitate is contaminated, however, with soluble salts, including the sodium sulphate formed during the reaction and some unreacted sodium hydroxide or magnesium sulphate. It is necessary to remove the contaminating substances. This is usually accomplished by allowing the gelatinous precipitate of magnesium hydroxide to settle and decanting the supernatant liquid and/or by filtering. Further purification of the product is necessary and may be accomplished by adding distilled water to the separated magnesium hydroxide sludge and again removing the wash water. The washing is repeated until the soluble salt content is so far reduced that it does not affect the taste of the washed magnesium hydroxide and is not injurious to the human stomach. The concentration of $Mg(OH)_2$ is then adjusted until it is about 8% by weight. This method of preparing milk of magnesia is relatively costly and is also disadvantageous for the reason that it is extremely difficult to reduce the soluble salt content sufficiently to meet the requirements of the U. S. Pharmacopoeia. Not only is the method disadvantageous, but, also, the product that is made by the method is unsatisfactory for the reason that the magnesium hydroxide as finally made up in a "milk", forms a suspension with water that settles after days or weeks leaving a water layer which is as great as 10% to 40% by volume, depending partly upon the length of time that the material has been left standing.

Another method of making milk of magnesia which has been practiced heretofore even more extensively than the method above described, comprises the direct hydration of pure calcined magnesia according to the following reaction:

$$MgO + H_2O = Mg(OH)_2$$

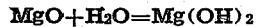

The magnesia used in the latter method is generally obtained from basic carbonate of magnesia which is the cheapest available source at the present time for making pure magnesium oxide. Basic magnesium carbonate is believed to have the approximate formula $$3MgCO_3 \cdot Mg(OH)_2 \cdot 3H_2O$$

and during calcination it loses water and carbon dioxide and is converted into substantially pure magnesium oxide. The calcination is done in any suitable way as by subjecting it to heat in a continuous kiln for a definite period of time. As thus produced, the calcination is carried on until the magnesium oxide usually contains only about 5% to 8% of unchanged basic carbonate of magnesia.

The magnesium oxide produced as aforesaid, or otherwise, may be converted into milk of magnesia of about 8% concentration, for example, merely by mixing about five and one-half parts of the magnesium oxide with about one hundred parts of water, either cold or hot. The hydration takes considerable time, and at first, a mass of sediment forms in the bottom of the mixture with a cloudy layer of water thereabove. The sediment consists of unreacted or partially reacted magnesium oxide. If the mixture is agitated from time to time for several weeks, the sediment will largely disappear and the material upon standing will form a lower layer of milk of magnesia in which the hydration of the magnesium oxide is substantially complete. The resulting milk of magnesia tends to settle leaving a relatively large layer of water, i. e., about 40%. If hot water is used the hydration of the magnesium oxide is somewhat more rapid than if cold water had been used, but the settling of the milk of magnesia is greater at the end of the process. If the suspension of magnesium oxide is permitted to stand until the hydration of the magnesium oxide, using either hot or cold water, is substantially complete, and is then passed through a colloid mill, the milk of magnesia can be made of a somewhat more thick and creamy consistency, and the tendency of the milk of magnesia to settle can be somewhat reduced. Hydration of magnesium oxide and subsequent treatment of the hydrated material in a colloid mill is the method which is most generally practiced at the present time in making milk of magnesia. However, even the best milks of magnesia made according to this method tend to settle out upon standing as much as 10% to 30%.

It is an advantage and feature of this invention that milk of magnesia is afforded which is of a superior, creamy consistency, and which has very slight tendency to settle. It is a further advantage and feature of milk of magnesia made according to and embodying this invention, that it has greater chemical activity than milks of magnesia heretofore made as determined by the rate of solution of the milk of magnesia in dilute acid. Further features and advantages of this invention relate to improvements in the uniformity of structure and size of the magnesium hydroxide particles held in suspension and to improvements in the method of making milk of magnesia.

It is a further feature and advantage of this invention that milks of magnesia having improved consistency and other properties can be produced without affecting the taste or color of the resulting product. An improved product can be made which meets in every respect the requirements of purity which are laid down in the U. S. Pharmacopoeia. Moreover, the medicinal properties of the improved milk of magnesia can be maintained precisely the same as the product which is now on the market. If it is desired, however, the medicinal properties of milk of magnesia can be improved not only by increasing the activity of the magnesia contained therein, but also by adding materials thereto which at the same time affect the therapeutic value of the milk of magnesia, while also improving the consistency, smoothness and non-settling properties of the milk.

When magnesium hydroxide is made by the hydration of magnesium oxide, the degree and rate of hydration are dependent to some extent upon the temperature at which the magnesium oxide has been calcined. Thus, when magnesium oxide has been calcined at about 2000° F., for example, its reaction with water is very slow and does not yield a magnesium hydroxide which can be advantageously used as milk of magnesia. If the temperature used in calcining is lower, for example, in the neighborhood of 1400° F., the resulting magnesium oxide will become hydrated more rapidly and will produce a better milk of magnesia. Magnesium oxide burned at a temperature of about 900° F. to 1100° F. gives further improved results. However, notwithstanding the improvement effected by burning magnesium oxide at lower temperatures, I have found that the hydrated oxide still is objectionable due to the excessive settling of the resultant product. Thus, when basic carbonate of magnesia is burned at 1400° F. and is completely hydrated under the most favorable conditions and subjected to treatment in a colloid mill, the resultant product settles as much as 10% to 25% of the total volume.

I have found that certain substances when added to milk of magnesia act as hydrating agents and so increase the hydration of the magnesia that the resultant milk is of a smooth, creamy, thickened nature, and does not settle except to a very slight degree. While this invention is not to be limited by the correctness of any theory which I may advance as to the phenomena that occur during hydration, I believe that the substances which I use make the particles of magnesium hydroxide in suspension more hydrous, and that by virtue of alteration in their size or of increase in the adhesion of water thereto, or both, the magnesium hydroxide particles become more hydrous and occupy more extent in space. The result, in any event, is that the milk of magnesia is given a creamy consistency and settles very little due to increased hydration of the magnesia.

In the practice of this invention the hydration of a suspension of magnesium hydroxide particles in water is increased by including in the suspension an electrolyte which is adsorbed by the magnesium hydroxide particles and which is itself adsorptive of water. Thus the conglomerates of magnesium hydroxide particles, adsorbed elelectrolyte, and bound water, occupy a greater extent in space and bind increased amounts of water thereto thus effecting more complete hydration.

When magnesium oxide is mixed with water, either hot or cold, it combines chemically with the water and is gradually converted into magnesium hydroxide. The physical state of the resulting magnesium hydroxide will depend upon the degree of hydration thereof. Thus the term "hydration" covers not only the conversion of MgO to $Mg(OH)_2$, but also the association of water with the $Mg(OH)_2$ particles. The electrolytic hydrating agents for magnesium hydroxide which are employed according to this invention promote the association of water with magnesium hydroxide particles and afford substantially greater hydration than occurs in the case of a suspension of magnesium hydroxide particles similarly prepared but in the absence of an electrolyte, for example, when the suspension is formed by hydrating magnesium oxide in pure water in the usual way. Electrolytic hydrating agents according to this invention promote the formation of stable suspensions of magnesium hydroxide which have creamy and substantially non-settling characteristics. The electrolytic hydrating agents used in the practice of this invention are believed to affect suspensions of magnesium hydroxide as a whole to afford what is believed to be increased hydration as evidenced by increased creamy consistency, improved reactivity and non-settling characteristics. It is believed that the electrolytic hydrating agents used in the practice of this invention affect the size of the conglomerates of magnesium hydroxide particles and adsorbed water and hydrating agent so that the size thereof is rendered favorable to increased hydration of the mass as such. If the phenomenon is other than what is technically called hydration, the terms hydration and electrolytic hydrating agent will be understood to cover the methods and substances respectively herein described.

This invention may be described for the purpose of illustration in connection with the use of magnesium bicarbonate as an electrolytic hydrating agent. If a milk of magnesia is made from magnesium oxide which has been burned at 1400° F. in the proportion of about five and one-half parts of oxide to one-hundred parts of water and the mixture of oxide and water is permitted to stand while cool for about twelve to twenty-four hours, the bulk of the magnesium oxide will be hydrated with the formation of a suspension containing about 8% of magnesium hydroxide. However, I have found that the hydration of the magnesium hydroxide is greatly increased by adding thereto about one-half percent to one and one-half percent of magnesium bicarbonate on the weight of dry MgO. The magnesium bicarbonate may be added in the form of a solution. Immediately after the magnesium bicarbonate solution is added, the suspension of magnesium hydroxide becomes thicker and creamier and its non-settling properties are greatly improved. Notwithstanding its thickened creamy consistency the milk of magnesia has highly desirable pouring characteristics. The color of the milk of magnesia is unchanged. The presence of the magnesium bicarbonate does not affect the taste of the milk of magnesia. Moreover, the physiochemical characteristics of the milk of magnesia are not changed.

I have found that where electrolytic hydrating agents are used there is an optimum amount which produces the greatest degree of hydration. Thus, for example, in the case of magnesium oxide which has been burned at 1400° F. and has been hydrated with cold water for twenty-four hours to form an 8% milk of magnesia, I have found that the percentage settling of the resultant mix gradually decreases upon the addition of magnesium bicarbonate thereto up to the point where about one percent of magnesium bicarbonate on the weight of magnesium oxide is added, and that upon adding increased amounts of magnesium bicarbonate above about one and one-half percent, the percentage settling begins to increase. The amount of electrolytic hydrating agent that gives optimum results can readily be determined by trial of the agent in various amounts.

The optimum amount of stabilizer or electrolytic hydrating agent varies to some extent, depending upon the temperature at which magnesium oxide has been burned. Thus, in the case of magnesium oxide which has been produced by calcining basic magnesium carbonate at about 1100° F. only one-tenth percent of magnesium bicarbonate on the weight of magnesium oxide is necessary to give optimum results.

While there is an optimum amount or range of electrolytic hydrating agent at which the best results are secured, there is an effective range of amounts of electrolytic hydrating agent within which substantially improved consistency reactivity and non-settling properties are secured. These improved characteristics of magnesium hydroxide suspensions according to this invention, may readily be determined by comparison with the characteristics of magnesium hydroxide suspensions made in substantially pure water or without the presence of an electrolytic hydrating agent as mentioned herein.

Ordinarily, it is preferable not to add an excess of electrolytic hydrating agent beyond that which affords optimum results or is within the effective range for affording improved hydration as there is danger of permanently affecting the magnesium hydroxide particles so that upon reducing the amount of agent to optimum or effective amounts full hydration of the magnesium hydroxide particles cannot be achieved and an inferior product will result. Likewise other substances may contaminate a suspension of magnesium hydroxide particles as they adversely affect the capacity of the magnesium hydroxide particles to become highly hydrated and may permanently affect the capacity of the magnesium hydroxide particles to become highly hydrated even though the contaminating substances are removed. It is normally preferable in the practice of this invention to hydrate magnesium oxide in substantially pure water, an electrolytic hydrating agent being incorporated in the magnesium hydroxide thus formed in not more than an effective amount as a hydrating agent.

While this invention is not to be limited upon the correctness of any theory which may be advanced as to the operation of electrolytic hydrating agents which may be used in the practice of this invention, it is believed the electrolytic hydrating agents such as magnesium bicarbonate produce ions which become adsorbed upon the particles of magnesium hydroxide. Thus, in the case of magnesium bicarbonate, the formula of which is believed to be $Mg(HCO_3)_2$, it is believed that ions thereof become adsorbed upon the magnesium hydroxide particles. While it cannot be determined which ion is responsible for the effects produced, it is believed that the $HCO_3^-$ ion is chiefly active in this regard and becomes adsorbed by or associated with the magnesium hydroxide particles. The ions adsorbed by the magnesium hydroxide particles are themselves adsorptive of water and thus it is believed that the suspension becomes more than a mixture of magnesium hydroxide particles in water and consists of numerous separate entities consisting of magnesium hydroxide particles plus adsorbed ions plus bound water. These entities tend to make the mass creamier and thicker and tend to reduce the rate of settling. However, different amounts of electrolytic hydrating agent are believed to exert different ultimate effects on the particles as by controlling the size of the conglomerates. At a certain point the size of the conglomerates is believed to reach a state whereat maximum colloidal effects are produced. Thus, it is that the addition of very small amounts of electrolytic hydrating agent such as slight traces may actually increase the thinness and the rate of settling of the milk of magnesia but that additional amounts may greatly decrease the rate of settling and produce a milk of magnesia of a thick creamy appearance. The addition of further amounts of hydrating agent may thereafter so further affect the size of the particle conglomerates that the milk of magnesia is again thinned and given increased settling tendencies.

While this invention has been illustrated hereinabove in connection with the use of magnesium bicarbonate as an electrolytic hydrating agent, numerous other electrolytic hydrating agents may also be used. Thus, in general, acids, bases and salts have some effect on the ultimate hydration of magnesium hydroxide and the following specific examples of electrolytic hydrating agents have been found to increase the thickness and resistance to settling of milk of magnesia, i. e., the salts sodium chloride, ammonium chloride, potassium permanganate, potassium ferrocyanide, sodium carbonate, sodium acetate, ammonium acid phosphate, magnesium sulphate, sodium oxalate, sodium bitartrate, borax, sodium bisulphite, magnesium citrate, magnesium carbonate trihydrate, magnesium bicarbonate; the bases ammonium hydroxide, sodium hydroxide and potassium hydroxide; and the acids phosphoric acid, sulphuric acid, carbonic acid, citric acid and tartaric acid. It is believed that the hydrating agents which may be used in the practice of this invention are electrolytic, as non-electrolytes or substantially non-electrolytes such as silicic acid, sugar, oleic acid, and alcohol, give no appreciable effect in increasing the thickness or resistance to settling of magnesium hydroxide suspensions.

The optimum amount of electrolytic hydrating agent that is used depends in part upon the substance that is used as a hydrating agent. For example, in the case of 8% milk of magnesia made from magnesium oxide calcined from basic magnesium carbonate at 1400° F., which has been aged twenty-four hours, the following amounts of electrolytic hydrating agent based on the dry weight of the magnesium oxide used were found to give substantially optimum results:

|  |  | Per cent |
|---|---|---|
| Acids | $H_3PO_4$ | 1 to 2 |
|  | $H_2SO_4$ | 1 to 2 |
| Bases | NaOH | 3 to 5 |
| Salts | NaCl | 10 to 20 |
|  | $MgSO_4$ | 1 to 2 |
|  | $(NH_4)_2HPO_4$ (approximately) | 2 |
|  | $Mg(HCO_3)_2$ | ½ to 1½ |
|  | $MgCO_3 \cdot 3H_2O$ | ½ to 1½ |

Since the percentages given in the foregoing table are based on the dry weight of magnesium oxide, the percentages of the different electrolytes are somewhat less than the figures above given when based on the dry weight of the magnesium hydroxide in the resulting suspension. The 20% given in the above table in connection with hydrochloric acid and sodium chloride is as large an amount of electrolyte as it is preferable to employ in the practice of this invention; with an electrolyte such as magnesium bicarbonate much less of electrolyte is preferable. Moreover, it is preferable that there be less than 20% of dissolved and undissolved substances in the suspension other than magnesium hydroxide particles.

Of the electrolytes the vast majority are sufficiently soluble so that they can be present in sufficient amount to be effective as hydrating agents. However, there are a very few substances such as hydrated lime, $Ca(OH)_2$, which are too insoluble in water to be effective as hydrating agents for magnesium hydroxide particles. In the case of hydrated lime its low degree of solubility combined with the fact that the $OH^-$ ion is relatively weak in its hydrating effect on magnesium hydroxide particles in suspension, prevents sufficient $OH^-$ ion concentration being built up to result in hydration of the magnesium hydroxide particles and such $OH^-$ ions that are liberated instead of tending to make milk of magnesia more creamy and thicker, tend to make a milk of magnesia, with which it is incorporated, somewhat more thin. There are other substances, such as magnesium carbonate trihydrate, which are no more soluble than hydrated lime, but which are highly effective as hydrating agents due to the greater effectiveness of the anion, which, upon solution, is the bicarbonate ion. As aforesaid, however, the vast majority of electrolytes are sufficiently water soluble to be effective as hydrating agents, and there is a very wide range of selection of electrolytic hydrating agents which may be used in the practice of this invention.

In the selection of an electrolytic hydrating agent for use in the practice of this invention it is preferable to select one which is bromatologically unobjectionable, that is, one which is compatible with the introduction thereof into the human stomach when used in amounts sufficient to improve the consistency and nonsettling qualities of milk of magnesia. In this connection acids are harmless from the point of view of the positive acid radical as high concentration of a positive acid radical is impossible in a suspension of magnesium hydroxide. With regard to the negative radicals of acids it is believed that radicals existing, for example, as the ions $Cl^-$, $SO_4^=$, $PO_4^\equiv$, $HPO_4^=$, $H_2PO_4^-$, borate$^-$, $CO_3^=$, $HCO_3^-$, tartrate$^-$, acid tartrate$^-$, and citrate$^-$, are bromatologically acceptable. The use of certain bases, while they tend to increase the thickness and resistance to settling of magnesium hydroxide suspensions, is generally undesirable where the resultant mixture is to be taken internally, as increased $OH^-$ concentration is in general toxic and also gives an undesirable taste to the mixture.

In connection with the use of salts, positive ions such as $NH_4^+$, $K^+$, $Na^+$, $Ca^{++}$, $Mg^{++}$, and $Fe^{++}$ or $Fe^{+++}$, are in general bromatologically harmless by themselves and when combined with negative ions such as those mentioned above in connection with acids, i. e., $Cl^-$, $SO_4^=$, $PO_4^\equiv$, $HPO_4^=$, $H_2PO_4^-$, borate$^-$, $CO_3^=$, $HCO_3^-$, tartrate$^-$, acid tartrate$^-$, citrate$^-$, and acetate$^-$ form salts which are bromatologically acceptable.

Electrolytic hydrating agents which are especially desirable both from the point of view of being bromatologically unobjectionable and from the point of view of having requisite solubility and high effectiveness to accomplish increased hydration of magnesium hydroxide particles in suspension when incorporated therein in a dissolved state include the group of electrolytes consisting of acids having the anions $SO_4^=$, $HSO_4^-$, $PO_4^\equiv$, $HPO_4^=$, $H_2PO_4^-$, $CO_3^=$, $HCO_3^-$, tartrate$^=$, and acid tartrate$^-$, the alkali-metal salts of the above acids, the alkali-metal chlorides, nitrates and borates, the sulphates, acid phosphates, acid carbonates, and acid tartrates of calcium, magnesium and iron, and the normal carbonates of magnesium. Acid salts are salts such, for example, as $CaHPO_4$, $NaHSO_4$, and $NaH_2PO_4$, which include one or more hydrogen atoms in addition to the normal atomic structure of the acid radical.

While there are a number of substances including acids, bases, and salts, which are effective electrolytic hydrating agents and a number of those which meet bromatological requirements, the majority of them affect the taste of the milk of magnesia with which the substances are mixed and in some instances the therapeutic properties of the milk are also modified, and while this may be advantageous in certain instances it is not desirable where a pharmaceutical preparation, answering standard specifications, is desired. In this connection it is preferable to employ as electrolytic hydrating agents according to this invention substances such as the carbonates of magnesia, e. g., $Mg(HCO_3)_2$, $MgCO_3.3H_2O$, and/or $H_2CO_3$, as these substances add no noticeable taste to milk of magnesia and add nothing to milk of magnesia which is not already there in some form, namely, MgO, $CO_2$, and $H_2O$. Moreover, the substances named give very satisfactory results even when used in very small amounts such as one-half percent to one and one-half percent on the weight of magnesium oxide due to the effectiveness of the bicarbonate ion which they yield in water solution as a hydrating agent.

In some instances it may be desirable to add electrolytic hydrating agents which not only improve the consistency and non-settling properties of milk of magnesia but also modify and improve its therapeutic properties. Thus, substances such as magnesium sulphate, sodium citrate, disodium phosphate, or salt may be used as hydrating agents. These substances are saline laxatives and give the resultant milk of magnesia increased laxative effect.

The electrolytic hydrating agent may be incorporated with and included in the milk of magnesia in a variety of different ways. Heretofore, it has been stated that in the case of magnesium oxide calcined from basic carbonate of magnesia at 1400° F., it is preferable to add at least part of the electrolytic hydrating agent after the magnesium oxide has been treated with water for twelve to twenty-four hours in the case of cold water. If hot water is used in hydrating the magnesium oxide the result is somewhat inferior to the results which are obtained when cold water is used, namely, the settling may be about 2% instead of 1% of the volume of the resulting mixture.

The electrolytic hydrating agent can be added to the magnesium oxide prior to the treatment of the magnesium oxide with water or at substantially the same time that the magnesium oxide is treated with water. In such case, however, the results are not as satisfactory in the case of magnesium oxide which has been calcined at 1400° F. and the resultant product where optimum amounts of electrolytic hydrating agents are used shows a final settling of about 3% to 7%. In the case of magnesium oxide calcined at lower temperatures such as 1100° F. excellent products can be obtained where the electrolytic hydrating agent is present at the time that the magnesium oxide is first treated with water. Thus a milk of excellent consistency and non-settling properties can be obtained by adding about 1% of $Mg(HCO_3)_2$ or 1½% of $MgCO_3.3H_2O$ to the oxide prior to the hydration thereof with water.

When the electrolytic hydrating agent is added to the magnesium oxide prior to or substantially simultaneously with the treatment of the oxide with water, the tendency of the oxide to form a sediment is greatly reduced and in the case of optimum amounts of hydrating agent substantially no sediment occurs. If more than the optimum amount of electrolytic hydrating agent, e. g., 3% of magnesium bicarbonate is added prior to or substantially simultaneously with the treatment of the oxide with water, the result is most extraordinary as a solid pseudo-gel is formed. The gel is of a translucent character and is easily broken up to give a translucent milk of magnesia which settles very little, i. e., about 1% to 2%. This product is very active toward dilute acid and is superior in this respect to milk of magnesia of a less translucent characer.

When the electrolytic hydrating agent employed is $H_2CO_3$, this may be accomplished in any desired way. Thus magnesium oxide may be first hydrated and then treated with $CO_2$ gas to form $H_2CO_3$ in the mixture. Moreover, a like result may be obtained by aerating magnesium oxide so that carbon dioxide in the air will be adsorbed by the magnesium oxide particles and then treating the magnesium oxide containing adsorbed $CO_2$ with water. In the case of magnesium oxide calcined at very low temperature, such as 900° F. to 1100° F., sufficient aeration can be obtained in a few minutes. In the case of magnesium oxide calcined at higher temperatures, the aeration may require several hours. If the aeration is continued too long, effects such as above described where more than an optimum amount of oxide is added prior to treatment with water will result, namely, the milk of magnesia will tend to form a pseudo-gel. In such case, it is believed that the carbon dioxide which is adsorbed upon magnesium oxide particles forms carbonic acid when the oxide is treated with water, the carbonic acid ionizing to form bicarbonate ions ($HCO_3^-$) and positive hydrogen ions. It is believed that ions are adsorbed upon the particles of magnesium hydroxide. The positive hydrogen ions are believed to be neutralized by the $OH^-$ radical of the $Mg(OH)_2$ leaving $HCO_3^-$ ions surrounding the particles of magnesium hydroxide and binding water thereto to create conditions favorable to colloidal gel conditions.

While carbonic acid can be used as an electrolytic hydrating agent in the practice of this invention, it is ordinarily preferable to employ substances such as magnesium bicarbonate or magnesium carbonate trihydrate because they are convenient to add in predetermined amounts so that increased certainty of results is afforded. It is difficult to ascertain when optimum amounts of $CO_2$ have been adsorbed from the air by aerating magnesium oxide or when a proper amount of $CO_2$ bubbled through a suspension of magnesium hydroxide has been adsorbed in proper degree.

When an electrolytic hydrating agent is added to magnesium oxide prior to the treatment of the magnesium oxide with water to form a substantially non-settling milk of magnesia according to this invention, it is of advantage that magnesium oxide admixed with a hydrating agent can be made up in advance and that a composition can be made up and sold containing magnesium oxide in combination with a substance which modifies the hydrating characteristics thereof. Thus, for example, magnesium oxide burned from basic magnesium carbonate at temperatures ranging from about 900° F. to about 1800° F. may be made up as a product in combination with an electrolytic hydrating agent, e. g., magnesium carbonate trihydrate, the magnesium carbonate trihydrate being, for example, about ½% to 1½% of the weight of the magnesium carbonate. While the specific substance magnesium carbonate trihydrate has been mentioned, other electrolytic hydrating agents mentioned hereinabove may be used. In this connection it is to be understood that when a substance adapted to become an electrolyte upon dissolving same in water is admixed with magnesium oxide prior to the addition of the oxide to water, such substance exhibits its electrolytic behavior when the oxide, together with the substance admixed therewith, is added to the water to increase the hydration of the magnesium hydroxide upon the conversion of the magnesium oxide, in presence of water and the electrolyte, to magnesium hydroxide. In this connection the amount of electrolytic hydrating agent will depend to a certain extent upon the particular hydrating agent used and upon the temperature at which the magnesium oxide has been burned, as hereinabove explained. While it is preferable to mix magnesium oxide with an electrolytic hydrating agent which is in a dry state, it is within the scope of this invention to mix the magnesium oxide with a liquid hydrating agent, e. g., magnesium bicarbonate solution.

The residue of unburned basic magnesium carbonate (about 5% to 8%) which is usually present in magnesium oxide calcined from basic magnesium carbonate does not have an appreciable effect as a hydrating agent. It is believed that the basic magnesium carbonate which has been subjected to the calcination has been modified so that it is incapable of forming ions which are adsorbed upon the particles of magnesium hydroxide with resultant increase in hydration. Moreover, the traces of other impurities in the calcined magnesium oxide also have no appreciable effect, and it is believed that such impurities actually make the resulting milk of magnesia of increased thinness and increased tendency to settle. However, by incorporating an electrolytic hydrating agent with magnesium oxide before or after treating same with water so that the agent is in an effective state to promote the hydration of the magnesium hydroxide and to ionize so that ions are adsorbed by the magnesium hydroxide particles and bind water thereto, a milk of magnesia can be made which is creamy in consistency and has little or no tendency to settle even after standing for many months unagitated.

An illustration of one way by which milk of magnesia may be advantageously made in the practice of this invention, follows: 500 gallons of cold water (about 20° to 30° C.) are placed in a suitable tank equipped with a powered stirrer, preferably of the high speed propeller type. 250 pounds of magnesium oxide calcined at a temperature of about 900° F. to 1400° F. are then added to the water and the mixture is stirred until the suspension is substantially homogeneous. The suspension is allowed to stand over night, namely, about 12 hours (or longer if more convenient) when it is stirred again. Intermediate stirring can be employed but is not essential. During the subsequent stirring there is added to the suspension 2.5 pounds of $MgCO_3.3H_2O$ in crystal form or if more convenient 16 gallons of 2% $Mg(HCO_3)_2$ solution, which solution, of high purity, is readily and cheaply available at plants which are engaged in the manufacture of basic carbonate of magnesia from Dolomite rock. The mixture immediately thickens and becomes of a creamy consistency. After stirring until the mixture is substantially homogeneous the material is ready for bottling and shipment without further treatment.

The resulting product has exceedingly good pouring properties and retains its desirable condition indefinitely. Even after standing for periods such as four months or more the suspensions will not settle more than about 1% to 3% of the total volume. Thus the milk of magnesia is substantially non-settling.

The resulting product is also found by test to exhibit increased reactivity as evidenced by increased rate of solution of the suspended magnesium hydroxide particles in dilute acid. Moreover, the resulting product is found to be more completely and uniformly soluble as evidenced by the occurrence of diminshed insoluble or difficultly soluble residues after treatment with dilute acid. Both of these improved characteristics are of importance, particularly when the milk of magnesia is taken internally, as it is desirable to have the milk of magnesia dissolve in the stomach acid as quickly and completely as possible. The improved product embodying and manufactured according to this invention has been tested in comparison with several prominent and widely advertised brands of milk of magnesia at present on the market by the following test procedure: A clean beaker is placed upon a black surface and 1 cc. of the well-shaken sample of milk of magnesia (about 8% concentration) is pipetted into the beaker. 200 cc. of distilled water is then added to the sample and after thorough stirring 100 cc. of 0.03 normal hydrochloric acid is quickly poured into the beaker, at the same time starting a stop-watch. The end point of the test is taken as the time elapsed when no further perceptible change in clarity of the solution takes place. The presence of any insoluble residue is noted, also the degree of clarity of the final solution. While the end point is not extremely precise, the differences found in treating different brands of milk of magnesia are very marked, and different tests of the same sample usually check within about 5%. The following is a comparative tabulation showing the reactivity range of various brands of milk of magnesia which were tested, the time of reaction being measured in seconds and the amount of insoluble or difficultly soluble residue being noted. With regard to the insoluble residue, a residual amount of 0.5 milligram per cc. of original milk is regarded as a slight amount, 1.0 milligram per cc. of original is regarded as a moderate amount, and 1.5 milligrams per cc. of original is regarded as a large amount.

| Milk of magnesia | Reactivity range time in seconds | Amount of insoluble residue |
|---|---|---|
| Improved product embodying the present invention | 24-60 | Trace to slight. |
| Brand A | 103-230 | Moderate. |
| Brand B | 188-330 | Moderate to large. |
| Brand C | 42-70 | Slight to moderate. |
| Brand D | 360 | Large. |
| Brand E | 120-133 | Slight to moderate. |
| Brand F | 50-80 | Do. |
| Brand G | 77-80 | Moderate. |
| Brand H | 134-180 | Large. |
| Brand I | 180-240 | Moderate to large. |
| Brand J | 145-200 | Moderate. |
| Brand K | 420-600 | Large. |
| Brand L | 145-180 | Slight. |

It is thus seen that the improved milk of magnesia embodying and made according to this invention exhibits greatly increased reactivity with dilute acids and contains a lessened amount of residue which is insoluble or difficultly soluble in dilute acid. In performing the above tests it was also noted that the improved product of this invention gave a much more clear and brilliant solution in the dilute acid as compared to the other brands of milk of magnesia tested.

In the practice of this invention it has been found that the point at which there is maximum non-settling afforded by the use of electrolytic hydrating agents according to this invention, is not necessarily the point at which there is greatest reactivity in dilute acid and that these advantages of the improved product do not necessarily run parallel to each other. Accordingly, the achievement of any of these improvements afforded by the use of hydrating agents according to this invention is to be regarded as coming within the scope of this invention.

The improved product embodying this invention has been examined under the microscope and photomicrographs of the improved product have been compared with photomicrographs of several prominent brands of milk of magnesia now on the market. As a result of the comparison it has been found that the improved milk of magnesia of the present invention possesses greatly increased uniformity of structure and size of particles. Photomicrographs of the improved product showed fields wherein the magnesium hydroxide particles were remarkably uniform and contained substantially no large agglomerates. On the other hand, photomicrographs of other milks of magnesia were in striking contrast thereto and showed fields containing very wide ranges in structure and size of particles and containing many crystals or masses of relatively large size. While this invention is not limited by the correctness of theories advanced herein, it is believed that the increased uniformity of particle structure and size is responsible at least in part for the improved non-settling and reactive properties of milk of magnesia embodying and made according to this invention, and it has been pointed out hereinabove that electrolytic hydrating agents employed according to this invention are believed to affect the size of magnesium hydroxide particles so that conditions of increased colloidality are achieved.

While tests have been given hereinabove of improved properties of milk of magnesia embodying and made according to this invention, it is to be understood that these tests have been given merely for the purpose of illustrating improvements which may be afforded according to this invention and that the advantages of this invention can be achieved when there is considerable variation from optimum conditions as hereinabove set forth and that this invention is to be limited only by the appended claims.

In the manufacture of milk of magnesia, according to this invention, it is of advantage that expensive procedure in methods of making milk of magnesia heretofore practiced is avoided. Thus, the long periods of hydration of MgO with intermittent agitation are avoided. Moreover, all necessity for colloid mill treatment in homogenizing the milk is avoided. One is permitted to use the cheapest source of pure magnesia, namely, MgO burned from basic carbonate of magnesia. Moreover, the expensive methods of metasynthesis of magnesium hydroxide with resulting washings, etc., is avoided.

An alternate method of making milk of magnesia in the practice of this invention is to employ magnesium oxide which has been burned at low temperature such as 900° F. to 1100° F. and which is very active. This material, due to its activity, can be readily stabilized by an electrolytic hydrating agent formed in the water as a result of aerating the oxide or a suspension of the oxide so as to absorb $CO_2$ and form carbonic acid. This could be done, for example, by stirring a suspension of the oxide with a propeller stirrer or with compressed air or $CO_2$ gas in a relatively short time.

While this invention has been illustrated chiefly in connection with milk of magnesia made by hydrating magnesium oxide suspensions it may also be practiced in stabilizing suspensions of magnesium hydroxide made by metasynthesis of soluble magnesium salts and suitable bases. In such case an electrolytic hydrating agent should preferably be added after the suspension of magnesium hydroxide has been made and washed free of soluble salts as the hydrating agent would, to large extent, be removed during the washing operation. However, milk of magnesia made by metasynthesis as above described affords a milk of magnesia which is considerably less creamy and non-settling in character as compared with milk of magnesia which is made by the hydration of magnesium oxide though the same hydrating agents are used.

While this invention has been described in connection with certain examples, it is to be understood that this has been done merely for the purpose of illustrating the practice of this invention. By thus mentioning numerous specific examples and giving general principles which are believed to be applicable, one skilled in the art will have no difficulty in selecting an electrolytic hydrating agent and effecting the stabilization of milk of magnesia according to this invention. It is an advantage of using electrolytic hydrating agents in the practice of this invention that they stabilize milk of magnesia by promoting hydration thereof thus making the resulting milk more active and of superior therapeutic value without the addition of gelatinous or viscous organic substances which are undesirable. Moreover, by using the carbonates of magnesia including the normal, acid, and basic carbonates of magnesia or carbonic acid in the stabilization of milk of magnesia, no objectionable alteration in taste, color, appearance, or physiochemical content is made and at the same time the consistency and chemical activity of the milk of magnesia are greatly improved and the milk of magnesia is rendered substantially non-settling.

I claim:

1. A method of making milk of magnesia which comprises forming a suspension of magnesium hydroxide particles in water by hydration of magnesium oxide with water, there being incorporated with the suspension a dissolved electrolytic hydrating agent in an amount effective to produce substantially greater hydration of the magnesium hydroxide particles than occurs in a suspension similarly prepared but in the absence of said electrolyte.

2. A method of making milk of magnesia which comprises incorporating with particles of magnesium hydroxide in suspension a dissolved electrolytic hydrating agent in an amount effective to produce substantially greater hydration of the magnesium hydroxide particles than occurs in a suspension similarly prepared but in the absence of an electrolyte, the magnesium hydroxide particles being free during the preparation thereof of an amount of electrolyte substantially in excess of an effective amount.

3. A method of making milk of magnesia which comprises forming a suspension of magnesium hydroxide particles in water, said suspension being substantially free of an electrolyte, and thereafter increasing the non-settling property of the suspension by incorporating a dissolved electrolytic hydrating agent in the suspension in sufficient amount to effect such increase.

4. A method of making milk of magnesia which comprises forming a suspension of magnesium hydroxide particles in water by a hydrating reaction of magnesium oxide with water and thereafter increasing the non-settling property of the suspension by incorporating a dissolved electrolytic hydrating agent in said suspension in sufficient amount to effect susch increase.

5. A method of making milk of magnesia which comprises hydrating magnesium oxide in water by hydration reaction between said oxide and water to form a suspension of the magnesium hydroxide in water, said hydration reaction being carried out in the presence of an amount of dissolved electrolytic hydrating agent effective to impart substantially gerater non-settling property to the suspension than if said suspension were similarly prepared but in the absence of said agent.

6. A method of making milk of magnesia which comprises hydrating with substantially pure water magnesium oxide burned at a temperature of from about 900° F. to about 1800° F. until the bulk of the magnesium oxide has been converted to magnesium hydroxide particles and forming a suspension of said magnesium hydroxide particles in said substantially pure water, and thereafter increasing the non-settling property of the suspension of magnesium hydroxide particles and increasing the reactivity thereof to dilute acid by incorporating not more than about 20% of a dissolved electrolytic hydrating agent (on the weight of dry magnesium oxide) in the suspension and in sufficient amount to effect such increase.

7. A method of making milk of magnesia which comprises substantially simultaneously treating magnesium oxide burned at a temperature of from about 900° F. to about 1100° F. with water to hydrate said oxide to form a suspension of magnesium hydroxide particles in water and with an amount of dissolved electrolytic hydrating agent effective to impart substantially greater non-settling property to said suspension than if the suspension were similarly prepared but in the absence of said agent, the amount of electrolytic hydrating agent being not more than 20% on the weight of dry magnesium oxide.

8. A method of making milk of magnesia having substantially greater reactivity to dilute hydrochloric acid than a milk of magnesia of like concentration substantially free of an electrolyte and prepared by hydrating magnesium oxide in water, which comprises forming a suspension of magnesium hydroxide in water containing in the neighborhood of eight per cent. of magnesium hydroxide by hydrating magnesium oxide by reaction with water, a dissolved electrolytic hydrating agent being included in said suspension in sufficient amount to increase the reactivity of the suspension to dilute hydrochloric acid as compared to the reactivity to dilute hydrochloric acid of a suspension of like concentration similarly prepared but not containing said agent, thereby producing a milk of magnesia having the increased reactivity aforesaid.

9. A method of making milk of magnesia having substantially greater reactivity to dilute hydrochloric acid than a milk of magnesia of the same concentration but consisting of magnesium hydroxide suspended in substantially pure water, which comprises forming a suspension of magnesium hydroxide in water by hydrating powdered magnesium oxide by reaction with water, the reactivity to dilute hydrochloric acid of the suspension being increased substantially beyond the reactivity to dilute hydrochloric acid of a suspension of the same concentration but consisting of magnesium hydroxide suspended in substantially pure water by the inclusion in the suspension of a dissolved electrolytic hydrating agent in an amount adapted to produce such increase, the resulting suspension being free of excess of said agent or of any other substance effective to cause the reactivity of the suspension to dilute hydrochloric acid to be approximately the same as or less than the reactivity to dilute hydrochloric acid of a suspension consisting of magnesium hydroxide suspended in substantially pure water, thereby producing a milk of magnesia having the increased reactivity to dilute hydrochloric acid aforesaid.

10. A method of making milk of magnesia which comprises forming a suspension of magnesium hydroxide in water by hydrating magnesium oxide with water and thereafter increasing the non-settling property of the suspension by incorporating a dissolved electrolytic hydrating agent therein in sufficient amount to affect such increase, said agent being selected from the group of electrolytes consisting of acids having the anions $SO_4^=$, $HSO_4^-$, $PO_4^≡$, $HPO_4^=$, $H_2PO_4^-$, $CO_3^=$, $HCO_3^-$, tartrate$^=$, and acid tartrate$^-$, the alkali-metal salts of the above acids, the alkali-metal chlorides, nitrates and borates, the sulphates, acid phosphates, acid carbonates and acid tartrates of calcium, magnesium and iron and the normal carbonates of magnesium.

11. In the manufacture of milk of magnesia wherein magnesium oxide is hydrated in water to form a suspension of magnesium hydroxide particles in water, the steps comprising hydrating said magnesium oxide with water to form magnesium hydroxide particles in the presence of a dissolved electrolytic hydrating agent in effective amount to produce a milk of magnesia having greater non-settling property than if the milk of magnesia were similarly hydrated but in the absence of said agent, said agent being selected from the group of electrolytes consisting of acids having the anions $SO_4^=$, $HSO_4^-$, $PO_4^≡$, $HPO_4^=$, $H_2PO_4^-$, $CO_3^=$, $HCO_3^-$, tartrate$^=$, and acid tartrate$^-$; the alkali metal salts of the above acids, the alkali-metal chlorides, nitrates and borates, the sulphates, acid phosphates, acid carbonates and acid tartrates of calcium, magnesium and iron and the normal carbonates of magnesium.

12. As a product, milk of magnesia of a creamy and very slight-settling character comprising primarily magnesium hydroxide particles in aqueous suspension, said milk of magnesia comprising water, magnesium hydroxide particles formed by interaction between magnesium oxide and water and a dissolved electrolytic hydration agent which is effective in the amount present in said product to give the milk of magnesia substantially greater non-settling property than a milk of magnesia similarly prepared but substantially free of an electrolyte.

13. As a product, milk of magnesia of a creamy and very slight-settling character comprising primarily magnesium hydroxide particles in aqueous suspension, said milk of magnesia comprising water, magnesium hydroxide particles formed by hydrating magnesium oxide with water and an electrolytic hydrating agent which is present in an amount adapted to impart greater non-settling property to the suspension than that of a suspension similarly prepared but in the absence of an electrolyte, and said agent being selected from the group of electrolytes consisting of acids having the anions $SO_4^=$, $HSO_4^-$, $PO_4^\equiv$, $HPO_4^=$, $H_2PO_4^-$, $CO_3^=$, $HCO_3^-$, tartrate=, and acid tartrate−, the alkali-metal salts of the above acids, the alkali-metal chlorides, nitrates and borates, the sulphates, acid phosphates, acid carbonates and acid tartrates of calcium, magnesium and iron and the normal carbonates of magnesium.

14. As a product, milk of magnesia of a creamy and very slight-settling character consisting essentially of magnesium hydroxide particles formed by hydrating magnesium oxide powder with water, the concentration of the suspension being in the neighborhood of eight per cent., and a dissolved electrolytic hydrating agent in an amount which is effective to give the milk of magnesia substantially greater non-settling property than a milk of magnesia of like composition but substantially free of an electrolyte.

15. As a product, milk of magnesia of a creamy and very slight-settling character consisting essentially of water, magnesium hydroxide particles in suspension in said water, said magnesium hydroxide particles being formed by interaction of magnesium oxide with water, and an electrolytic hydrating agent which is present in an amount adapted to impart to the suspension greater reactivity to dilute hydrochloric acid than that of a suspension of like concentration of similarly formed magnesium hydroxide particles in substantially pure water, said agent being selected from the group of electrolytes consisting of acids having the anions $SO_4^=$, $HSO_4^-$, $PO_4^\equiv$, $HPO_4^=$, $H_2PO_4^-$, $CO_3^=$, $HCO_3^-$, tartrate=, and acid tartrate−, the alkali-metal salts of the above acids, the alkali-metal chlorides, nitrates and borates, the sulphates, acid phosphates, acid carbonates and acid tartrates of calcium, magnesium and iron and the normal carbonates of magnesium.

16. As a product, milk of magnesia of a creamy and very slight-settling character consisting essentially of a suspension of magnesium hydroxide particles stabilized by a saline laxative which is an electrolytic hydrating agent in said milk of magnesia, said saline electrolytic hydrating agent having laxative properties being effective to increase the non-settling property of the magnesium hydroxide particles in suspension in comparison with a suspension similarly prepared but in the absence of said agent, and said magnesium hydroxide particles having been formed primarily by interaction between magnesium oxide and water.

17. As a product, milk of magnesia of a creamy and very slight-settling character consisting essentially of a suspension of magnesium hydroxide particles in water and stabilized by an electrolyte in effective amount to increase the non-settling property of the magnesium hydroxide particles in suspension, said electrolyte consisting essentially of one yielding bicarbonate ions in solution and being bromatologically acceptable in the quantity employed.

18. As a product, the composition comprising magnesium oxide produced by calcining basic magnesium carbonate at a temperature of from about 900° F. to about 1800° F. said magnesium oxide thus produced being in admixture with a small proportion of magnesium carbonate trihydrate.

19. As a product, the composition comprising magnesium oxide produced by calcining basic magnesium carbonate at a temperature of from about 900° F. to about 1800° F., said magnesium oxide in major proportion in said product being in dry admixture with a substance which is adapted to become an electrolyte having bicarbonate ions when dissolved in water and to increase the non-settling properties of the magnesium hydroxide particles when the mixture is added to water.

20. As a product, milk of magnesia containing less than 20% of dissolved and undissolved substances other than magnesium hydroxide, said milk of magnesia comprising a suspension of magnesium hydroxide particles in water and an electrolyte yielding bicarbonate ions in water solution, said electrolyte being effective to cause said milk of magnesia to be of a substantially more creamy and non-settling character than if said electrolyte were not present.

21. As a product, milk of magnesia of a creamy and very slight-settling character consisting essentially of magnesium hydroxide particles in suspension and an electrolyte consisting of carbonate of magnesium yielding bicarbonate ions in water solution which is effective in the amount present in said product to give the milk of magnesia substantially greater non-settling property than a milk of magnesia containing a similar proportion of magnesium hydroxide in substantially pure water.

22. As a product, milk of magnesia of a creamy and very slight-settling character consisting essentially of a suspension of magnesium hydroxide particles formed by hydration of magnesium oxide particles with water and modified by the incorporation therein of carbonic acid so as to give the milk of magnesia substantially greater non-settling property than a milk of magnesia containing a similar proportion of magnesium hydroxide in substantially pure water.

23. As a product, milk of magnesia of a creamy and very slight-settling character consisting essentially of a suspension of magnesium hydroxide particles in the neighborhood of 8% concentration and an electrolyte yielding bicarbonate ions in solution in effective amount to give the milk of magnesia such non-settling property that the milk of magnesia will not settle more than about 3% of its total volume in a period of 4 months.

24. A method of making milk of magnesia which comprises forming a suspension of magnesium hydroxide in water having less than 20% of dissolved and undissolved substances other than magnesium hydroxide and having incorporated therein an electrolyte yielding bicarbonate ions in water solution, said electrolyte being effective to give the milk of magnesia substantially greater non-settling characteristics than a milk of magnesia similarly prepared but without the incorporation of said electrolyte.

25. A method of making milk of magnesia which comprises aerating a quantity of magnesium oxide powder and adsorbing thereon by said aeration an amount of carbon dioxide that is adapted to form with water carbonic acid in effective amount to increase the non-settling properties of a suspension of magnesium hydroxide made by treating the aforesaid quantity of magnesium oxide with water, and then making from said magnesium oxide a water suspension of magnesium hydroxide stabilized by said carbonic acid.

26. A method of making milk of magnesia which comprises calcining basic magnesium carbonate at a temperature of from about 900° F. to about 1800° F. to form magnesium oxide, forming a suspension of magnesium hydroxide particles in water by hydrating the resulting oxide in powdered condition with water until the bulk of the oxide has been converted to magnesium hydroxide, and then incorporating with the suspension an electrolyte yielding bicarbonate ions in solution thereby substantially increasing the non-settling property of the suspension of magnesium hydroxide particles beyond that possessed by it prior to the addition of said electrolyte.

27. A method of making milk of magnesia which comprises calcining basic magnesium carbonate at a temperature of from about 900° F. to about 1800° F. to form magnesium oxide, adding an electrolyte yielding bicarbonate ions in water solution to the resulting oxide, and forming a suspension of magnesium hydroxide particles in water by hydrating said oxide in powdered condition with water in the presence of said electrolyte thereby producing a milk of magnesia having substantially greater non-settling property than a milk of magnesia similarly prepared but in the absence of said electrolyte.

28. A method of making milk of magnesia which comprises forming a suspension of magnesium hydroxide in water by hydrating magnesium oxide particles with water, said suspension including less than 20% of dissolved and undissolved substances other than magnesium hydroxide and having incorporated therein magnesium carbonate effective to give the milk of magnesia substantially greater non-settling characteristics than milk of magnesia similarly prepared but without the incorporation of said magnesium carbonate.

ROGER A. MACARTHUR.